(12) United States Patent
Young

(10) Patent No.: US 6,346,832 B1
(45) Date of Patent: Feb. 12, 2002

(54) MULTI-CHANNEL SIGNALING

(75) Inventor: Brian D. Young, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/575,257

(22) Filed: May 22, 2000

(51) Int. Cl.[7] .............................................. H03B 1/00
(52) U.S. Cl. ..................... 327/108; 327/563; 330/258
(58) Field of Search .............................. 327/108, 109, 327/110, 111, 112, 563; 326/30, 81, 82, 83, 86; 330/252, 253, 258; 365/189.05

(56) References Cited

U.S. PATENT DOCUMENTS

| | | | |
|---|---|---|---|
| 4,272,728 A | * 6/1981 | Wittlinger | 330/258 |
| 5,166,635 A | * 11/1992 | Shih | 330/253 |
| 5,254,956 A | * 10/1993 | Nishijima | 330/258 |
| 5,287,386 A | 2/1994 | Wade et al. | 375/36 |
| 5,481,497 A | * 1/1996 | Yamauchi et al. | 365/189.05 |
| 5,565,808 A | * 10/1996 | Lo | 327/211 |
| 5,712,875 A | 1/1998 | Wooten | 375/257 |
| 5,742,204 A | * 4/1998 | Bell | 330/258 |
| 5,880,599 A | 3/1999 | Bruno | 326/56 |
| 5,939,904 A | * 8/1999 | Fetterman et al. | 330/258 |
| 5,939,926 A | 8/1999 | Uber | 327/382 |
| 5,990,743 A | * 11/1999 | Gabara | 330/258 |
| 6,005,895 A | 12/1999 | Perino et al. | 375/288 |
| 6,198,650 B1 | * 3/2001 | Suh | 365/63 |

* cited by examiner

Primary Examiner—Kenneth B. Wells
Assistant Examiner—Paul Dinh
(74) Attorney, Agent, or Firm—James L. Clingan, Jr.; Robert L. King

(57) ABSTRACT

A transmission circuit provides two outputs. The two outputs carry both signal information as a differential voltage and carry a signal as a common mode voltage. The differential voltage is sensed by a comparator. The common mode voltage is sensed by a single-ended amplifier. This transmission circuit is combined with another one so that the signal, which is carried as the common mode signal, is carried on the first pair of differential signals as well as a second pair of differential signals. Thus, one signal is carried as a differential signal on two lines, a third signal is carried as a differential signal on two additional lines, and the common mode signal is carried on all four lines. The first two lines provide the differential signal which is sensed by a comparator. The second pair of lines carries a differential signal which is sensed by another comparator. The first pair of lines is combined to provide a common mode signal. The second pair of lines is combined to provide a complementary common mode signal. The true and the complementary common mode signals are sensed by a comparator. Thus, four lines carry 3 differential signals which are all capable of high speed and may be synchronous or asynchronous.

19 Claims, 3 Drawing Sheets

MULTI-CHANNEL SIGNALING

FIELD OF THE INVENTION

The invention relates to multi-channel signaling, and more particularly to multi-channel signaling which includes differential signaling.

BACKGROUND OF THE INVENTION

Transmission of data has been achieved in several ways. Typically the most efficient way, from a number of transmission lines involved or outputs involved, is to use a single line for each data signal. This style of signaling is commonly called single-ended signaling. Another technique, which is much faster, is to use two lines per signal and for them to be differential, i.e., using differential signals. Another technique is to use a high-speed carrier and have data, in one form or another, modulating that carrier. The technique using modulation is generally a wireless technique and has, of course, the advantage of not requiring wires. A disadvantage of it, though, is that is does require special electronics to assemble all that information and get it transmitted properly, and also on the receiving end there may be not just electronics but antennas and other space-requiring hardware involved. This is generally not practical for information transfer within a circuit board or within a product such as a computer.

The primary reason that differential signaling is significantly faster than single-ended signaling is that the majority of noise that occurs will occur on both lines and has the effect of being cancelled out. This is commonly called common mode rejection. The voltage differential between the two complementary signals provides the logic state information of the data signal. Thus, at the receiving end it is the voltage differential that is detected. Noise will affect both signals equally so the differential remains the same as that transmitted.

The disadvantages of having two wires per signal, however, are significant. In the case of an integrated circuit transmitting a differential signal, that means the integrated circuit itself has two output pins for each signal, and the pin count significantly impacts cost and reliability as well as size of the integrated circuit itself. The number of pins affects the cost of making the semiconductor wafers that have the integrated circuit die as well as the package which houses or carries the integrated circuit when shipped to the end user. The size aspect impacts the end user because the integrated circuit is generally located on a product. The available space on a printed circuit board that contains the integrated circuit in the product is typically desired to be as small as possible. It is advantageous if there is less space taken up by the integrated circuit.

By way of example, a channel of data may be 72 pins. The 72 pins represent both the true and complements of the information. If single-ended signaling were utilized instead, only 36 pins would be required. On the other hand if differential signaling is utilized, for each additional channel, seventy-two more pins are required instead of thirty-six for single-ended. Thus there is a significant disadvantage in adding an additional channel. Accordingly, there is a need for high-speed data transmission without having to add additional pins.

DETAILED DESCRIPTION OF THE DRAWINGS

Figure 1:
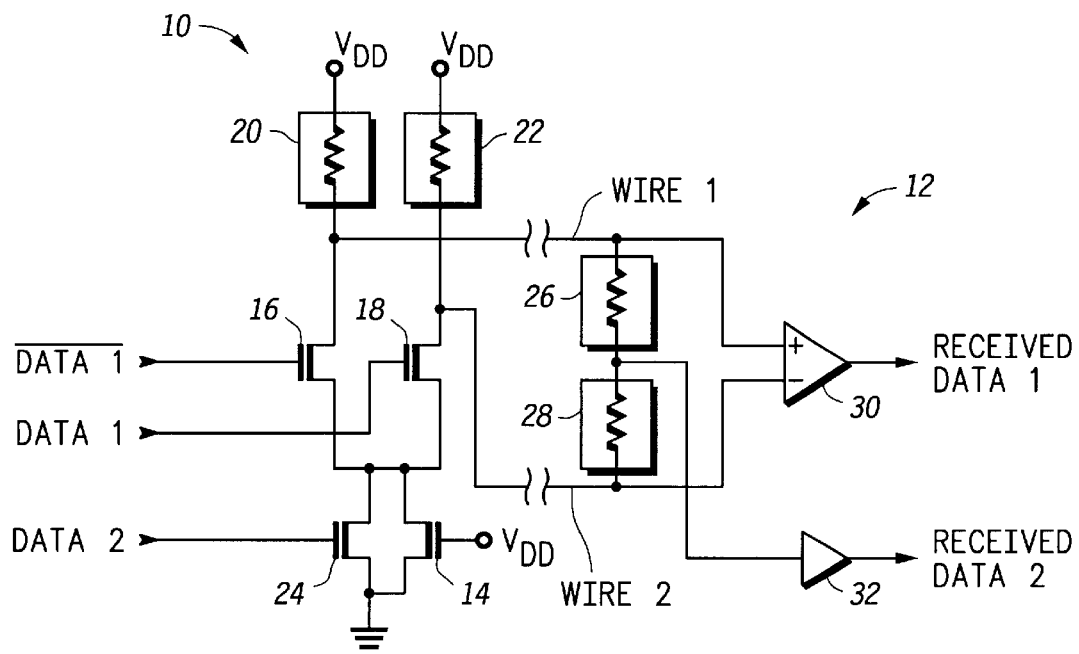
FIG. 1 is a circuit diagram of a circuit according to an embodiment of the invention.

Shown in FIG. 1 is a transmission circuit 10 and a receive circuit 12. Transmission circuit 10 comprises an N channel transistor 14, an N-channel transistor 16, an N-channel transistor 18, a resistive element 20, a resistive element 22, and an N-channel transistor 24. Receive circuit 12 comprises a resistive element 26, a resistive element 28, a comparator 30, and a single-ended amplifier 32. Transmission circuit 10 utilizes DATA 1, and DATA 2 to generate a pair of signals on WIRE 1 and WIRE 2 which contain both a differential signal and a common mode signal. The common mode signal represents DATA 2. The differential signal is DATA 1 and $\overline{\text{DATA 1}}$. DATA 1 and $\overline{\text{DATA 1}}$ are maintained within a voltage range which ensures that transistors 16 and 18 do not become non-conductive. Transistor 24 is switched between a conductive and a less conductive or non-conductive state. Transistor 14 ensures that there is some current flowing through transistors 16 and 18. Transistors 16, 18, 24, 14, and resistive elements 20 and 22 comprise a differential amplifier that is modulated by DATA 2.

Resistive element 20 has a first terminal connected to a power supply terminal VDD and a second terminal shown as being connected to WIRE 1. Resistive element 22 has a first terminal connected to VDD and a second terminal connected to WIRE 2. Transistor 16 has a drain connected to the second terminal of resistor 20, a gate for receiving $\overline{\text{DATA 1}}$ and a source. Transistor 24 has a drain connected to the source of transistor 16, a gate for receiving DATA 2 and a source connected to a negative supply terminal shown as ground. Transistor 14 has a drain connected to the source of transistor 16, a gate connected to a positive power supply terminal, shown as VDD, and a source connected to negative power supply terminal, shown as ground. Transistor 18 has a drain connected to the second terminal of resistive element 22, a gate for receiving DATA 1, and a source connected to the drain of transistor 14.

Figure 2:
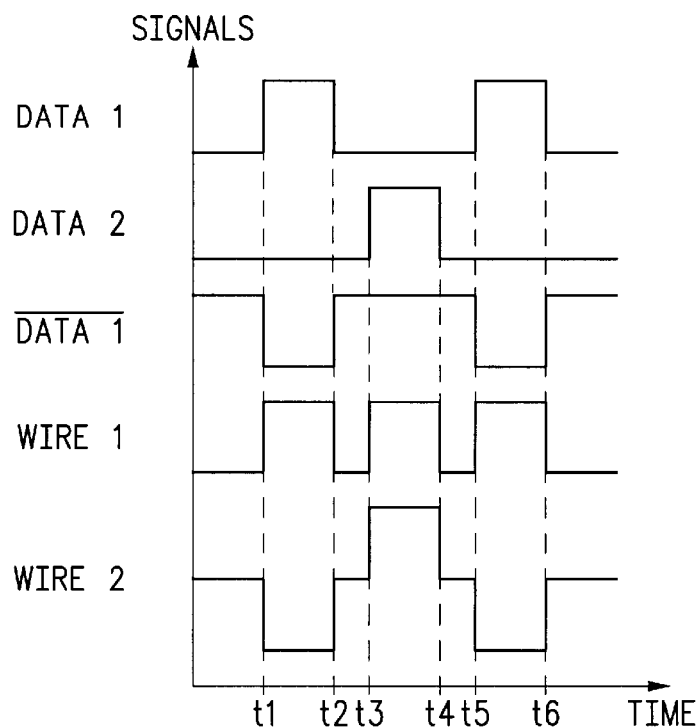
FIG. 2 is a timing diagram relevant to the circuit of FIG. 1.

As shown in FIG. 2, DATA 1 begins as a logic low so that $\overline{\text{DATA 1}}$ begins as a logic high. DATA 2 begins as a logic low. At time t1 there is a transition of the DATA 1 signal from a logic low to a logic high. Similarly, $\overline{\text{DATA 1}}$ switches from a logic high to a logic low. WIRE 1 switches from a lower voltage to a higher voltage in response to this. Similarly, WIRE 2 switches from a higher voltage to a lower voltage. The voltages on WIRE 1 and WIRE 2 reflect these different logic states with a voltage differential of about 600 millivolts (mv). At time t2 DATA 1 switches from a logic high to a logic low and has the effect of switching WIRE 1 from a higher voltage back to lower voltage and WIRE 2 from a lower voltage to a higher voltage. At time t3 when DATA 1 is a logic low, DATA 2 switches to a logic high. This is reflected in WIRE 1 and WIRE 2 both switching to a higher voltage. However, the difference between WIRE 1 and WIRE 2 does not change. This is a change in the common mode signal or common mode level between WIRE 1 and WIRE 2.

At time t4 DATA 2 switches back to a logic low and this is again reflected in WIRE 1 and WIRE 2 switching back to the lower voltage state. The amount of reduction voltage corresponds to that of DATA 2. Again, the time t5 shows DATA 1 switching to the logic high which results in WIRE 1 and WIRE 2 switching logic states, WIRE 1 switching to a relatively higher voltage, WIRE 2 switching to a relatively lower voltage.

Resistors 20, 22, 26 and 28 are conveniently chosen to each be 50 ohms. This is to provide impedance matching at 50 ohms which is the typical industry standard. In a differential amplifier a termination of 50 ohms is typically achieved with a 100-ohm resistor connected between the differential pair. In this case the 100 ohms is achieved by two 50-ohm transistors. Resistors 26 and 28 provide the 100 ohms and the node between these two resistors provides the common mode signal which is utilized as a data signal. The resistive elements 20 and 22 are selected at 50 ohms similarly to match the impedance to avoid reflections. Since the common mode signal is being utilized as a data signal, it is more important to provide for impedance matching which minimizes the reflections. Resistors 20, 22, 26 and 28 may be typical linear resistors but these resistive elements may also be replaced by transistors which achieve similar type of impedance at the voltages that are utilized. In current integrated circuits a typical VDD would be 1.8 to 2.5 volts. It is clear the industry is moving to lower and lower voltages so VDD may be a lower voltage. This could also result in the voltage differential between WIRE 1 and WIRE 2 being less than 600 mvs. That would not present a problem or a different approach in concept to that shown in FIG. 1.

WIRE 1 and WIRE 2 are representative of what may be a fairly lengthy wire. It could either be just a wire on a printed circuit board, or it could be a cable connection between two computers. The connection of resistor 20 to WIRE 1 is simply a connection to an output terminal of an integrated circuit which in turn is connected to WIRE 1. Similarly, the drain of transistor 18, as shown, is connected to WIRE 2. This is representative of an output of an integrated circuit being connected to WIRE 2. The extension of WIRE 1 and WIRE 2 are connections between an integrated circuit which includes transmission circuit 10 to a receiving circuit 12. Receiving circuit 12 could be resident on an integrated circuit either on a similar printed circuit board, a different printed circuit board, or some other product different from the product that contains circuit 10.

Comparator 30 of receive circuit 12 has a plus input connected to WIRE 1 and a minus input connected to WIRE 2 and provides an output representative of DATA 1. Resistive element 26 has a first terminal connected to WIRE 1, and a second terminal. Resistive element 28 has a first terminal connected to WIRE 2 and a second terminal connected to the second terminal of resistive element 26. The connection of the second terminals of resistive elements 26 and 28 provide the common mode voltage between the signals present on WIRE 1 and WIRE 2. Single-ended amplifier 32 has an input connected to the second terminals of resistive elements 26 and 28 and has an output representative of DATA 2 and is shown in FIG. 1 as received DATA 2.

The common mode voltage on the input of single-ended amplifier 32 is representative of the DATA 2 signal which is input into transistor 24. The common mode voltage is the voltage which is half way between the differential voltages. In addition to the signal DATA 2 there is noise on the common mode voltage. This noise is expected and anticipated in a differential amplifying system. The presence of noise in the common mode signal, however, does means that difficulty of reliably detecting the common mode signal will be greater than for detecting the differential signal present on WIRE 1 and WIRE 2. This is the typical distinction between single-ended and differential sensing. That there is a differential signal present on WIRE 1 and WIRE 2 allows for high speed of detection of the logic state. The noise that is accumulated in the common mode signal is, in effect, rejected because amplifier 30 is looking at a difference only and not at the absolute values of the signals whereas the common mode signal is detected at only a single input which is available to provide the information. Accordingly, the rate that the logic state can be detected is significantly slower, typically by an order of magnitude. Thus, the transmission and receive circuits shown in FIG. 1 provide both a high speed differential signal and a common mode signal which is utilized as a single-ended input for single-ended amplifier 32, which is substantially slower than the differential amplifier for reliable detection.

A significant advantage is that a standard high-speed differential signal is received on two lines and, in addition, a data signal is received as the common mode signal and detected as a data signal. Accordingly, there is a benefit of having an additional signal in addition to the high-speed signal. Although it is slower in speed, it may be useful for a number of things. One example would be handshaking control, flow control, status and other functions which may not need the high-speed data rate of the differential signal. These signals are shown in FIG. 2.

Figure 3:
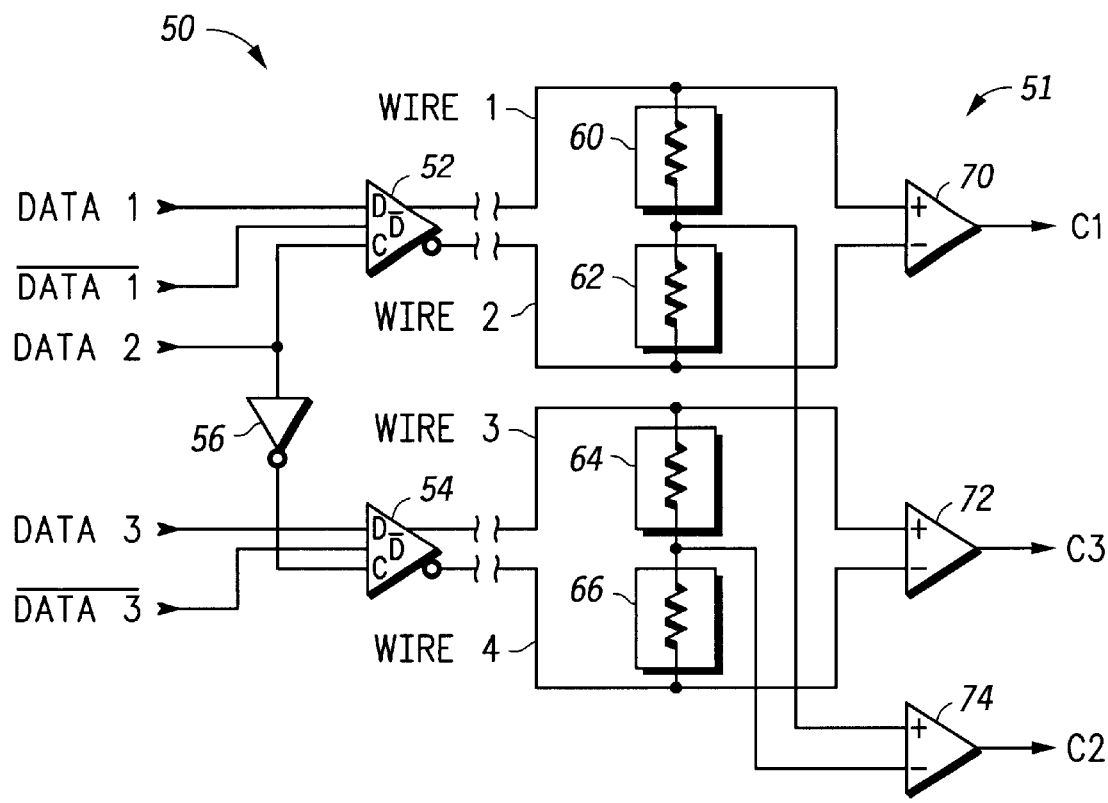
FIG. 3 is a circuit diagram of a circuit according to another embodiment of the invention.

Shown in FIG. 3 is a transmission circuit 50 and a receiving circuit 51. Transmission circuit 50 comprises a transmit circuit 52 and a transmit circuit 54 which are constructed in the same manner as transmitting circuit 10 in FIG. 1. Circuit 50 further comprises an inverter 56. Transmit circuits 52 and 54 have two complementary data inputs and having a common mode input. Transmit circuit 52 has a true and a complementary data inputs receiving DATA 1 and $\overline{DATA\,1}$ as in similar fashion in FIG. 1. A common mode input similarly receives DATA 2. Transmitting circuit 54 has a pair of data inputs for receiving a DATA 3 and a $\overline{DATA\,3}$ and a common mode input coupled to an output of inverter 56. The input of inverter 56 receives DATA 2. Circuit 50 would be resident on a single integrated circuit. Transmitting circuit 52 would have a true output and a complementary output coupled to WIRE 1 and WIRE 2, respectively. Similarly, transmitting circuit 54 has a true and complementary output coupled to WIRE 3 and WIRE 4, respectively.

Receiving circuit 51 comprises a pair of resistors 60 and 62, and a pair of resistors 64 and 66. Resistors 60 and 62, as a pair, terminate WIREs 1 and 2 in similar fashion to resistors 26 and 28 terminating WIRE 1 and WIRE 2 of FIG. 1. Resistive elements 64 and 66 terminate WIRE 3 and WIRE 4. Receiving circuit 51 further comprises comparators 70, 72 and 74. Comparator 70 has a plus input coupled to WIRE 1 and a minus input coupled to WIRE 2. This is in conventional differential amplifier fashion having a comparator coupled to a differential input. Comparator 70 provides an output C1 which is representative of DATA 1. Similarly, comparator 72 has a plus input coupled to WIRE 3 and a minus input coupled to WIRE 4 in conventional differential signal amplification techniques. Comparator 72 thus detects the difference between WIRE 3 and WIRE 4 and provides an output representative of data channel 3 and shown as signal C3 in FIG. 3. Comparator 74 also detects a differential signal. In this case, however, comparator 74 detects a difference in common mode voltage in two separate common mode signals.

Comparator 74 has a plus input coupled to the connection between resistors 60 and 62. Comparator 74 has a minus input coupled to the connection between resister 64 and 66. Resistor 60 has a first terminal connected to WIRE 1 and a second terminal connected to the plus input of comparator 74. Resistor 62 has a first terminal connected to WIRE 2 and a second terminal connected to the plus input of comparator 74. Resister 64 has a first terminal connected to WIRE 3 and a second terminal connected to the minus input of comparator 74. Resistor 66 has a first terminal connected to WIRE 4 and a second terminal to the minus input of comparator 74. The result of this configuration is that four differential wires are utilized to produce not just two differential signals but three. As differential signals they are thus potentially high-speed. Thus, there is an increase in differential signals of one for every two that are generated using two lines per differential signal. Thus, for a given number of pins you get a 50 percent increase in the number of differential signals that are available. The differential signals are ones that can be operated at high speed. Further, these three data signals, DATA 1, DATA 2 and DATA 3 do not have to be synchronized with each other for this operation.

Figure 4:
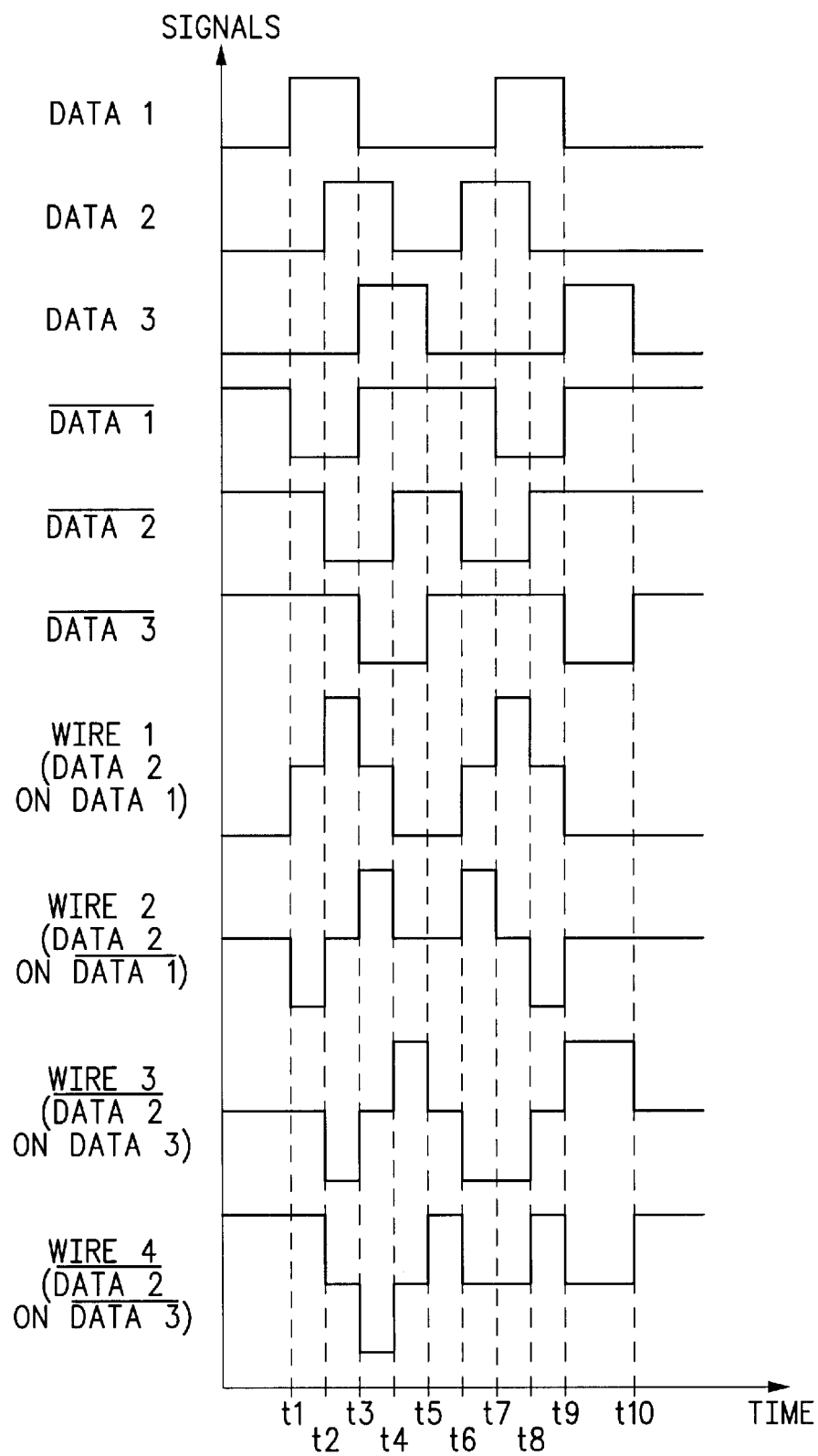
FIG. 4 is a timing diagram relevant to the circuit of FIG. 3.

Shown in FIG. 4 is a timing diagram of a possible combination of data signals, DATA 1, 2 and 3. This shows DATA 1 switching beginning at a voltage representative of a logic 0 and switching to a voltage representative of a logic 1. This occurs at time t1. At time t2 data signal 2 switches from a logic low to a logic high and then some time later at time t3 DATA 1 switches to a logic low, DATA 3 switches to a logic high and DATA 2 remains at a logic high. At a time t4 DATA 2 switches to a logic low and at a time t5 DATA 3 switches to a logic low. Complementary signals $\overline{\text{DATA}}$ 1, 2 and 3 switch in the reverse states to those of the true states which they complement. WIRE 1 shows that DATA 2 and DATA 1 are combined. Thus at time t1 DATA 1 is a logic high so that WIRE 1 switches to a voltage that is higher than the logic low condition. At time t2 while DATA 1 is high, DATA 2 switches to a logic high so that WIRE 1 increases in voltage and response. WIRE 2, which carries DATA 2 combined with $\overline{\text{DATA 1}}$, shows that at time t1 WIRE 2 switches to a lower voltage in response to $\overline{\text{DATA 1}}$ switching low. At time t2 WIRE 2 switches to a higher voltage in response to DATA 2 switching to a logic high. Thus, you can see at time t2 both the voltages on WIRE 1 and WIRE 2 increased so that the differential between the two did not change but both WIRE 1 and WIRE 2 did increase in voltage. Thus, this is indicative of an increase in the common mode voltage at this time. This increase in common mode voltage is representative of the logic high of DATA 2. A similar situation occurs beginning at time t6 in which DATA 2 switches from a logic low to a logic high which causes an increase in voltage in WIRE 1 and WIRE 2 at time t6. At time t7 when DATA 1 switches to a logic high and $\overline{\text{DATA 1}}$ thus switches to a logic low, there is an increase in the voltage on WIRE 1 and a decrease in the voltage on WIRE 2. This does cause a change in the difference between WIRE 1 and WIRE 2. This difference in voltage between WIRE 1 and WIRE 2 is representative of the logic state change which occurs on DATA 1. In this case there is no change in the common mode voltage, that is to say the average voltage of the two remains the same thus indicating that there is no change in the logic state of the signal carried in the common mode signal.

A similar situation is achieved with WIREs 3 and 4. At time t2 DATA 2, the signal carried in the common mode voltage, causes both WIRE 3 and WIRE 4 to reduce in voltage. At time t3 DATA 3 switches from a logic low to a logic high and $\overline{\text{DATA 3}}$ switches from a logic high to a logic low which results in WIRE 3 increasing in voltage and WIRE 4 decreasing in voltage. The increase in voltage on WIRE 3 is shown to be substantially the same as the decrease in voltage on WIRE 4. Thus, there is no change in the common mode voltage which is the desired result. This indicates that there is no change in the signal carried in the common mode which is accurate because DATA 2 does not change logic state at time t3.

At time t4 DATA 2 does change logic state, as does $\overline{\text{DATA 2}}$. $\overline{\text{DATA 2}}$ increases from a logic low to a logic high, which causes an increase in voltage in both WIRE 3 and WIRE 4. In this case, only DATA 2 is changing and not DATA 3. Thus, the desired result is that the common mode voltage changes but the differential does not change. This is shown in WIRE 3 and WIRE 4 as being the case. At time t5 DATA 3 and $\overline{\text{DATA 3}}$ switch logic states while DATA 2 and $\overline{\text{DATA 2}}$, which is output by inverter 56, do not. Thus, WIRE 3 and WIRE 4 should change voltage in the opposite direction which is shown in FIG. 4 as WIRE 3 reduces in voltage at time T5 while WIRE 4 increases in voltage at time T5. The effect then is to have a voltage differential on WIRE 1 and WIRE 2 representative of DATA 1 which is conventional for differential amplifying in the high speed that is available with such technique. Similarly, WIRE 3 and WIRE 4 have a voltage differential which is input into comparator 72, as is desired for differential amplifying operation. Thus, an additional differential signal is available through common mode signals present between resistors 60, 62 and between resisters 64 and 66.

The common mode signal, which is the true representation of DATA 1, is provided between resistors 60 and 62. The complementary common mode representation of DATA 2 is between resistors 64 and 66. Thus, there is a differential signal and therefore a high-speed signal established for DATA 2. WIREs 1, 2, 3 and 4 would be run close together so that any noise generated on one would occur on the other so that the noise would be able to be rejected based on the fact of differential sensing. This differential sensing would be equally true for DATA 2 as it is for DATA 1 and DATA 3. The circuit of FIG. 1 which is replicated by virtue of transmission circuits 52 and 54 in FIG. 3 are shown as being made using N-channel transistors. P-channel transistors could also be utilized by reversing the polarity of the power supplies and rearranging the resistors and the current source and altering the power supply connections accordingly. Another alternative is to ensure that the DATA 2 signal does not make transistor 24 non-conductive, in which case it may not be necessary to utilize a transistor such as transistor 14.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. For example, driver circuit 10 has advantages, but other circuits that perform the function of providing a differential output in response to one data signal and a common mode of the differential output being responsive to a second signal may be used to achieve benefits described herein. Thus, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for transmitting two independent data channels, comprising the steps of:

receiving a first data channel signal at a first data terminal;

receiving a second data channel signal at a second data terminal;

coupling the first data channel signal and the second data channel signal to a driver circuit having a first output and a second output;

providing a first output data signal at the first output of the driver circuit, the first output data signal representing a combination of the first data channel signal and the second data channel signal; and providing a second output data signal at the second output of the driver circuit, the second output data signal representing the combination of the first data channel and the second data channel signal; and receiving the first data channel signal and the second data channel signal as independent, asynchronous data;

wherein the first output data signal and the second output data signal have a differential representative of the first data channel signal and a common mode representative of the second data channel signal.

2. A method for transmitting two independent data channels, comprising the steps of:

receiving a first data channel signal at a first data terminal;

receiving a second data channel signal at a second data terminal;

coupling the first data channel signal and the second data channel signal to a driver circuit having a first output and a second output;

providing a first output data signal at the first output of the driver circuit, the first output data signal representing a first combination of the first data channel signal and the second data channel signal; and providing a second output data signal at the second output of the driver circuit, the second output data signal representing a second combination of the first data channel and the second data channel signal;

transmitting the first output data signal via a first conductor and transmitting the second output data signal via a second conductor;

receiving the first output data signal and the second output data signal at a predetermined destination;

transforming the first output data signal and the second output data signal to the first data channel signal with a differential-to-single ended driver circuit; and recovering a common mode signal between the first data output signal and the second output data signal to provide the second data channel signal at the predetermined destination.

3. The method of claim 2 wherein the step of recovering the common mode signal further comprises the step of:

coupling two substantially equal resistive elements between the first data channel signal and the second data channel signal and coupling an input of an amplifier between the two resistive elements to provide the second data channel signal.

4. A method for transmitting two independent data channels, comprising the steps of:

receiving a first data channel signal at a first data terminal;

receiving a second data channel signal at a second data terminal;

coupling the first data channel signal and the second data channel signal to a driver circuit having a first output and a second output;

providing a first output data signal at the first output of the driver circuit, the first output data signal representing a combination of the first data channel signal and the second data channel signal; and providing a second output data signal at the second output of the driver circuit, the second output data signal representing the combination of the first data channel and the second data channel signal;

wherein in the steps of providing a first output data signal and providing a second output data signal, the combination is implemented by a superimposing of signals; and wherein the first output data signal and the second output data signal have a differential representative of the first data channel signal and a common mode representative of the second data channel signal.

5. A multiple data channel driver circuit, comprising:

a first input for receiving a first data signal;

a second input for receiving a complement of the first data signal;

a third input for receiving a second data signal, the second data signal having data independent of the first data signal;

a first current path for developing a first output data signal in response to both the second data signal and the complement of the first data signal, the first output data signal representing a combination of the first data signal and the second data signal;

a second current path for developing a second output data signal in response to both the second data signal and the first data signal, the second output data signal representing the combination of the first data signal and the second data signal, the second data signal being used in both the first and second output data signals to form a common mode signal containing data from the second data signal.

6. A multiple data channel driver circuit, comprising:

a first input for receiving a first data signal;

a second input for receiving a complement of the first data signal;

a third input for receiving a second data signal;

a first current path for developing a first output data signal in response to both the second data signal and the complement of the first data signal, the first output data signal representing a combination of the first data signal and the second data signal;

a second current path for developing a second output data signal in response to both the second data signal and the first data signal, the second output data signal representing the combination of the first data signal and the second data signal, the second data signal being used in both the first and second output data signals to form a common mode signal containing data from the second data channel;

wherein the first current path comprises:

a first resistive element having a first terminal coupled to a first supply terminal, and having a second terminal;

a first transistor having a first current electrode coupled to the second terminal of the first resistive element, a control electrode for receiving the complement of the first data signal, and a second current electrode;

a second transistor having a first current electrode coupled to the second current electrode of the first transistor, a control electrode for receiving the second data signal, and a second current electrode coupled to a second supply terminal; and a third transistor having a first current electrode coupled to the second current electrode of the first transistor, a second current electrode coupled to the second supply terminal, and a control electrode for receiving a bias voltage.

7. The multiple data channel driver of claim 6 wherein the second current path further comprises:

a second resistive element having a first terminal coupled to the first supply terminal, and having a second terminal; and a fourth transistor having a first current electrode coupled to the second terminal of the second resistive element, a control electrode for receiving the first data signal, and a second current electrode coupled to the first current electrodes of the second and third transistors.

8. A high speed, multiple data channel driver circuit, comprising:

a first driver having a first input for receiving a first data signal, a second input for receiving a complement of the first data signal, and a third input for receiving a second data signal, the first driver providing first and second output signals which contain a differential mode representing the first data signal and a common mode which represents the second data signal; and a second driver having a first input for receiving a third data signal, a second input for receiving a complement of the third data signal, and a third input for receiving a complement of the second data signal, the second driver providing first and second output signals which contain a differential mode representing the third data signal and a common mode which represents the complement of the second data signal.

9. The high speed, multiple data channel driver circuit of claim 8 further comprising:

a first conductor coupling the first output signal of the first driver to a first receiver input;

a second conductor coupling the second output signal of the first driver to a second receiver input;

a third conductor coupling the first output signal of the second driver to a third receiver input;

a fourth conductor coupling the second output signal of the second driver to a fourth receiver input;

first and second series-connected resistive elements connected via a first node and coupled between the first receiver input and the second receiver input for developing a first common mode voltage at the first node;

third and fourth series-connected resistive elements connected via a second node and coupled between the third receiver input and the fourth receiver input for developing a second common mode voltage at the second node;

a first comparator having a first input coupled to the first receiver input, a second input coupled to the second receiver input, and an output for providing the first data signal;

a second comparator having a first input coupled to the third receiver input, a second input coupled to the fourth receiver input, and an output for providing the third data signal; and a third comparator having a first input coupled to the first node, a second input coupled to the second node, and an output, the third comparator subtracting the first and second common mode voltages and providing the second data signal in response thereto;

wherein the first, second and third data signals are capable of each being transmitted at a high speed.

10. The high speed, multiple data channel driver circuit of claim 9 wherein the first, second, third and fourth series-connected resistive elements each have substantially the same resistance.

11. The high speed, multiple data channel driver circuit of claim 9, wherein the first, second, and third data signals are synchronous.

12. The high speed, multiple data channel driver circuit of claim 9, wherein the first, second, and third data signals are asynchronous.

13. A method of transmitting data, comprising the steps of:

receiving a first data signal and providing in response thereto a pair of differential signals;

receiving a second data signal, the second data signal having data independent of the first signal;

combining the second data signal with the pair of differential signals so that a common mode of the differential signals represents the second data signal; and transmitting the pair of differential signals.

14. The method of claim 13 further comprising the steps of:

transmitting the pair of differential signals via a pair of conductors;

receiving the pair of differential signals;

comparing the pair of differential signals to recreate the first data signal; and developing a common mode voltage from the common mode of the differential signals and buffering the common mode voltage to recreate the second data signal.

15. The method of claim 13 further comprising the steps of:

receiving a third data signal and providing in response thereto a second pair of differential signals;

combining the second data signal with the second pair of differential signals so that a common mode of the second pair of differential signals represents the second data signal; and transmitting the second pair of differential signals.

16. A method of transmitting data, comprising the steps of:

receiving a first data signal and providing in response thereto a first pair of differential signals;

receiving a second data signal, the second data signal having data independent of the first data signal;

combining the second data signal with the first pair of differential signals so that a common mode of the first pair of differential signals represents the second data signal;

receiving a third data signal and providing in response thereto a second pair of differential signals; and combining the second data signal with the second pair of differential signals so that a common mode of the second pair of differential signals represents the second data signal.

17. A method of transmitting data, comprising the steps of:

receiving a first data signal and providing in response thereto a first pair of differential signals;

receiving a second data signal;

combining the second data signal with the first pair of differential signals so that a common mode of the first pair of differential signals represents the second data signal;

receiving a third data signal and providing in response thereto a second pair of differential signals;

combining the second data signal with the second pair of differential signals so that a common mode of the second pair of differential signals represents the second data signal;

transmitting the first pair of differential signals via a first pair of conductors;

receiving the first pair of transmitted differential signals;

comparing the pair of differential signals to recreate the first data signal; and developing a first common mode voltage from the common mode of the first pair of transmitted differential signals;

transmitting the second pair of differential signals via a second pair of conductors;

receiving the second pair of transmitted differential signals;

comparing the second pair of transmitted differential signals to recreate the second data signal;

developing a second common mode voltage from the common mode of the second pair of transmitted differential signals; and comparing the first and second common mode voltages to recreate the third data signal.

18. The method of claim 17, wherein the first and second common mode voltages are complementary.

19. A driver circuit comprising:

first output means for providing a first differential signal with a first variable common mode voltage, wherein a variable voltage difference of the differential signal is responsive to a first data signal and the first variable common mode voltage varies in response to the second signal; and second output means for providing a second differential signal with a second variable common mode voltage, wherein a variable voltage difference of the second differential signal is responsive to a third data signal and the second variable common mode voltage varies in response to the second signal.

* * * * *